(12) United States Patent
Williams

(10) Patent No.: US 7,801,447 B1
(45) Date of Patent: Sep. 21, 2010

(54) METHOD AND SYSTEM FOR SIGNAL PROCESSING BY MODULATION OF AN OPTICAL SIGNAL WITH A MULTICHANNEL RADIO FREQUENCY SIGNAL

(75) Inventor: Brett A. Williams, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1091 days.

(21) Appl. No.: 11/363,240

(22) Filed: Feb. 28, 2006

(51) Int. Cl.
H04B 10/00 (2006.01)
H04B 10/04 (2006.01)

(52) U.S. Cl. .................. 398/116; 398/141; 398/183; 398/207; 398/214

(58) Field of Classification Search .................. 398/115, 398/116, 117, 118, 119, 122, 123, 125, 127, 398/183, 186, 187, 192, 185, 202, 153, 140, 398/214, 212, 207, 200, 198, 151, 141; 342/22, 342/52, 53, 54, 57, 58
See application file for complete search history.

(56) References Cited

U.S. PATENT DOCUMENTS

| 3,991,417 | A | 11/1976 | Levine |
| 4,087,815 | A | 5/1978 | Garrison et al. |
| 4,216,474 | A | 8/1980 | Levine |
| 4,258,363 | A | 3/1981 | Bodmer et al. |
| 4,329,686 | A | 5/1982 | Mourou |
| 4,620,193 | A | 10/1986 | Heeks |
| 4,673,939 | A | 6/1987 | Forrest |
| 4,806,932 | A | 2/1989 | Bechtel |
| 4,885,589 | A | 12/1989 | Edward |
| 4,922,256 | A | 5/1990 | Brandstetter |
| 4,929,956 | A | 5/1990 | Lee et al. |
| 5,051,754 | A | 9/1991 | Newberg |
| 5,117,239 | A | 5/1992 | Riza |
| 5,177,488 | A | 1/1993 | Wang et al. |
| 5,181,138 | A | 1/1993 | Davis et al. |
| 5,231,405 | A | 7/1993 | Riza |
| 5,247,309 | A | 9/1993 | Reich |
| 5,353,033 | A | 10/1994 | Newburg et al. |
| 5,359,334 | A | 10/1994 | Gutman |
| 5,442,360 | A | 8/1995 | Maignan et al. |
| 5,657,027 | A * | 8/1997 | Guymon, II ................ 342/445 |
| 5,677,697 | A | 10/1997 | Lee et al. |
| 5,751,242 | A | 5/1998 | Goutzoulis et al. |
| 5,848,763 | A | 12/1998 | Michell et al. |
| 5,977,911 | A | 11/1999 | Green et al. |

(Continued)

OTHER PUBLICATIONS

L.A. Johansson et al., "Sampled-grating DBR Laser Integrated with SOA and Tandem Electroabsorption Modulator for Chirp-Control", *Electronics Letters* online No: 20040016 (Oct. 24, 2003) IEE 2004.

(Continued)

*Primary Examiner*—M. R. Sedighian
(74) *Attorney, Agent, or Firm*—Buchanan Ingersoll & Rooney PC

(57) ABSTRACT

A signal processing system is disclosed having a detector for detecting an RF signal, wherein the detector has plural detection channels. A modulator modulates an optical signal with the detected RF signal and a processor processes the modulated optical signal to determine an azimuth or an elevation of the detected RF signal.

42 Claims, 3 Drawing Sheets

U.S. PATENT DOCUMENTS

Figure 1:
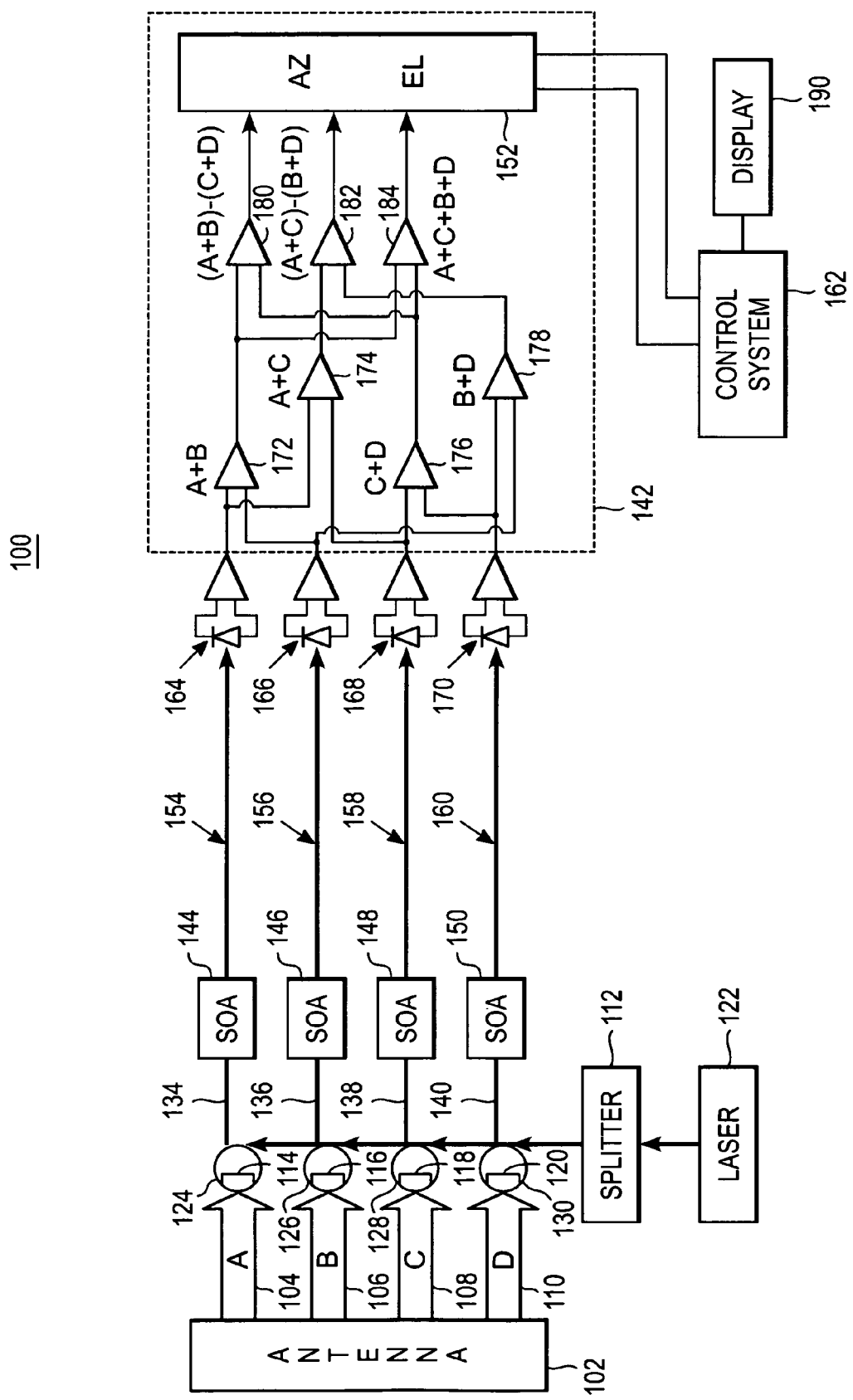

| | | | |
|---|---|---|---|
| 6,124,827 | A | 9/2000 | Green et al. |
| 6,125,104 | A | 9/2000 | Shiragaki et al. |
| 6,262,681 | B1 | 7/2001 | Persechini |
| 6,362,906 | B1 | 3/2002 | O'Shea |
| 6,417,804 | B1 | 7/2002 | Merlet et al. |
| 6,525,682 | B2 | 2/2003 | Yap et al. |
| 6,574,021 | B1 | 6/2003 | Green et al. |
| 6,768,458 | B1 | 7/2004 | Green et al. |
| 6,870,499 | B2 | 3/2005 | Burns |
| 6,871,025 | B2 | 3/2005 | Maleki et al. |
| 7,053,814 | B2 | 5/2006 | Yap |
| 7,162,156 | B2 * | 1/2007 | Frey et al. .................. 398/115 |
| 7,382,983 | B2 | 6/2008 | Mizuma et al. |
| 2003/0090767 | A1 * | 5/2003 | Yap et al. .................... 359/181 |
| 2004/0001719 | A1 * | 1/2004 | Sasaki ........................ 398/115 |
| 2004/0208590 | A1 * | 10/2004 | Nabors et al. ............... 398/115 |
| 2004/0239548 | A1 | 12/2004 | Burns |
| 2005/0018721 | A1 | 1/2005 | Kish, Jr. et al. |
| 2005/0156778 | A1 | 7/2005 | Yap |
| 2005/0238362 | A1 * | 10/2005 | Sekiya et al. ............... 398/147 |
| 2006/0012519 | A1 | 1/2006 | Mizuma et al. |
| 2009/0051582 | A1 | 2/2009 | Williams |

OTHER PUBLICATIONS

"Microphotonic RF Receiver (1999-2004)" Presentation given at USC Aug. 2004; Presentation given at May 2004 CLEO Conference; www.usc.edu/dept/engineering/eleceng/Adv_Network_Tech/html/RFreceiver.html (Nov. 9, 2005) 9 pages.

Thomas A. Germer, "Measurement of Roughness of Two interfaces of a Dielectric Film by Scattering Ellipsometry", *Physical Review Letters* 85(2), 349-352 (2000), pp. 1-8.

Thomas A. Germer et al., "Characterizing Surface Roughness of Thin Films by Polarized Light Scattering", *Advanced Characterization Techniques for Optics, Semiconductors, and Nanotechnologies*, A. Duparre and B. Singh, Eds., Proc. SPIE 5188, 264-275 (2003).

Williams, Copending U.S. Appl. No. 12/027,868 filed Feb. 7, 2008 entitled "Miniaturized Microwave-Photonic Receiver".

Oh II, Whan et al., "Novel Phototonic RF Receiver Using Tunable Brillouin Filtering and Optical Mixing," Mircrowave Photonics, 2001, 2001 International Topical Meeting, Jan. 7-9, 2002, pp. 195-197.

Hunter, D.B. et al.m "Wideband Microwave Photonic Channelised Receiver," Microwave Photonics, 2005, International Topical Meeting, Oct. 12-14, 2005, pp. 249-252.

Howerton, M.M. et al., "Low-Biased Fiber Optic Link for Microwave Downconversion," Photonics Techology Letters, IEEE, Dec. 1996, vol. 8, No. 12, pp. 1692-1694.

International Search Report issued Dec. 8, 2008 in International Application No. PCT/US2008/001599 corresponding to copending U.S. Appl. No. 12/027,868.

International Search Report issued Apr. 24, 2008 in corresponding International Application No. PCT/US07/05074.

Howerton, M. M. et al., "Subvolt Broadband Litihium Niobate Modulators," http://www.nrl.navy.mil/content.php?P=02REVIEW177.

Cohen, D.A. et al. "Microphotonic Components for MM-Wave Receiver," Solid State Electronics, 45 (2001). pp. 495-505.

Cohen, David Alan, "Lithium Niobate Microphotonic Modulators," May 2001, PhD Dissertation, pp. i-159.

Ilchenko, V. S., et al, "Sub-Microwatt Photonic Microwave Receiver," IEEE Photonics Technology Letters, vol. 14, No. 11, Nov. 2002, pp. 1602-1604.

"Amplitude Modulation," Image source: http://www.ele.uri.edu/Courses/ele436/labs/expA2.pdf.

Ilchenko, V.S., et al., "Whispering gallery mode electro-optic modulator and photonic microwave receiver," J. Opt. Soc. Am. B, vol. 20, No. 2, Feb. 2003, pp. 333-342.

Balistreri, M.L.M. et al., "Visualizing the whispering gallery modes in a cylindrical optical microcavity," Optics Letters, vol. 24, No. 24, Dec. 15, 1999, pp. 1829-1831.

Mazzei, A. et al, "Optimization of prism coupling to high-Q modes in a microsphere resonator using a near-field probe." Optical Communications, 250 (2005), pp. 428-433.

Hovanessian, "Radar System Design and Analysis", Artech House, 1984, p. 20.

Gorodetsky; M.L., et al, "Optical microsphere resonators: optimal coupling to high-Q whispering-gallery modes," J. Opt. Soc. Am. B, vol. 16, No. 1, Jan. 1999, pp. 147-154.

Laine, J.P, et al, "Microsphere resonator mode characterization by pedestal anti-resonant reflective waveguide coupler," IEEE Photon. Technology Letters, vol. 12, No. 8, Aug. 2000, pp. 1004-1006.

Muga, J.G. et al., "Time dependence of quantum evanescent waves," arXiv: Quantum Physics, vol. 1, Jan. 12, 2000, pp. 1-16.

Castagné, M. et al., "Photon Tunneling From InP Material Surface", LINCS-CEM University Montpellier II, undated, pp. 202-205.

Gifford, A.D. et al., "Comparison of photodiode frequency response measurements to 40GHz by NPL and NIST," Electronics Letters, vol. 31, No. 5, 2$^{nd}$ Mar. 1995, pp. 397-398 http://ts.nist.gov/ts/htdocs/230/233/calibrations/optical-rad/pubs/el31-397.pdf.

Davidson, Andrew et al. "Photodiode-Based Detector Operates at 60GHz", Undated, http://www.newfocus.com/Online_Catalog/Literature/Photodiode.pdf.

Bernard, Jean-Jacques et al., "Semiconductor Optical Amplifiers," OE Magazine, Sep. 2001, pp. 1-8 http://oemagazine.com/fromTheMagazine/sep01/tutorial.html.

Armstrong, I. et al, "Semiconductor optical amplifiers: performance and applications in optical packet switching," Journal of Optical Networking, vol. 3, No. 12, Dec. 2004, Abstract.

Kang, Y. et al, "Fused InGaAs-Si Avalanche Photodiodes With Low Noise Performance", IEEE Technology Photonics Technology Letters, vol. 14, No. 11, Nov. 2002, pp. 1593-1595 http://repositories.cdlib.org/cgi/viewcontent.cgi?article=1868&context=postprints.

Kwon, O.H. et al, "Optimal Excess Noise Reduction in Thin Heterojunction AlGaAs—GaAs Avalanche Photodiodes," IEEE J. Quant. Electron., vol. 39, No. 10, Oct. 2003, pp. 1287-1296.

* cited by examiner

METHOD AND SYSTEM FOR SIGNAL PROCESSING BY MODULATION OF AN OPTICAL SIGNAL WITH A MULTICHANNEL RADIO FREQUENCY SIGNAL

BACKGROUND

On-board seekers have been used with vehicles such as airborne vehicles for control purposes, such as guidance control. In certain applications, there is a desire to reduce the size of the seeker to accommodate reduced sized vehicles, such as miniaturized rockets and/or missiles. In some cases, for example, the vehicle can be a rocket or missile having a diameter of less than two inches.

On-board receivers operated at lower frequencies have components such as waveguides that are relatively large. Higher frequency receivers can have higher cost and atmospheric losses.

Passive airborne radio frequency receivers receive reflections from targets illuminated by external tracking radar, such as a ground radar transmitter. Semi-active laser (SAL) seekers receive target reflections from external laser illuminators, such as a launch platform laser illuminator associated with air-to-ground missiles.

Microwave-photonic receivers for high data rate wireless communication over wide bandwidths are known. For instance, a web page entitled "Microphotonic RF Receiver (1999-2004)", available on the University of Southern California website at dept/engineering/eleceng/Adv_Network_Tech/Html/RFreceiver.html, discloses a microwave-photonic wireless communication system for use, for example, in WiFi applications.

The microphotonic receivers discussed employ microresonator discs. Microresonator discs capture laser light input through evanescent wave coupling from a coupling prism and optical fiber. Each microresonator disc modifies a laser signal cycling within its so called "whispering gallery mode" perimeter by radio frequency phase modulation coupled to the microresonator disc via a microstrip waveguide. The microstrip waveguide can be configured in a periodic ring formation bonded to the top and bottom perimeter of the disc known as a radio frequency electrode resonator. The phase modulation is converted to amplitude modulation, internally, by self-mixing, or externally, by a traditional Mach-Zehnder configuration. Modulated optical signals couple out of the microresonator disc through the same prism mechanism used for input.

SUMMARY

A signal processing system is disclosed which includes a detecting means for detecting an RF signal, wherein the detecting means has plural detecting channels. A modulating means modulates an optical signal with the detected RF signal, and a processing means processes the modulated optical signal to determine an azimuth or an elevation of the detected RF signal.

A signal processing system includes an antenna having plural antenna channels for detecting an RF signal; a modulator for modulating an optical signal with the detected RF signal from each of the plural antenna channels and outputting a modulated optical signal in a separate modulation channel for each of the plural antenna channels; an interface for outputting signals corresponding to peak power of the detected RF signal in each modulation channel; and a processor for determining, based on the signals from the interface, an azimuth value or an elevation value of the detected RF signal.

Also disclosed is a method for processing a signal by detecting an RF signal using plural detection channels; modulating an optical signal using the RF signal detected by each of the plural detection channels and sending a modulated optical signal over plural modulation channels, and determining an azimuth or elevation of the detected RF signal using the filtered signals from each of the plural modulation channels.

BRIEF DESCRIPTION OF THE DRAWING FIGURES

Figure 2:
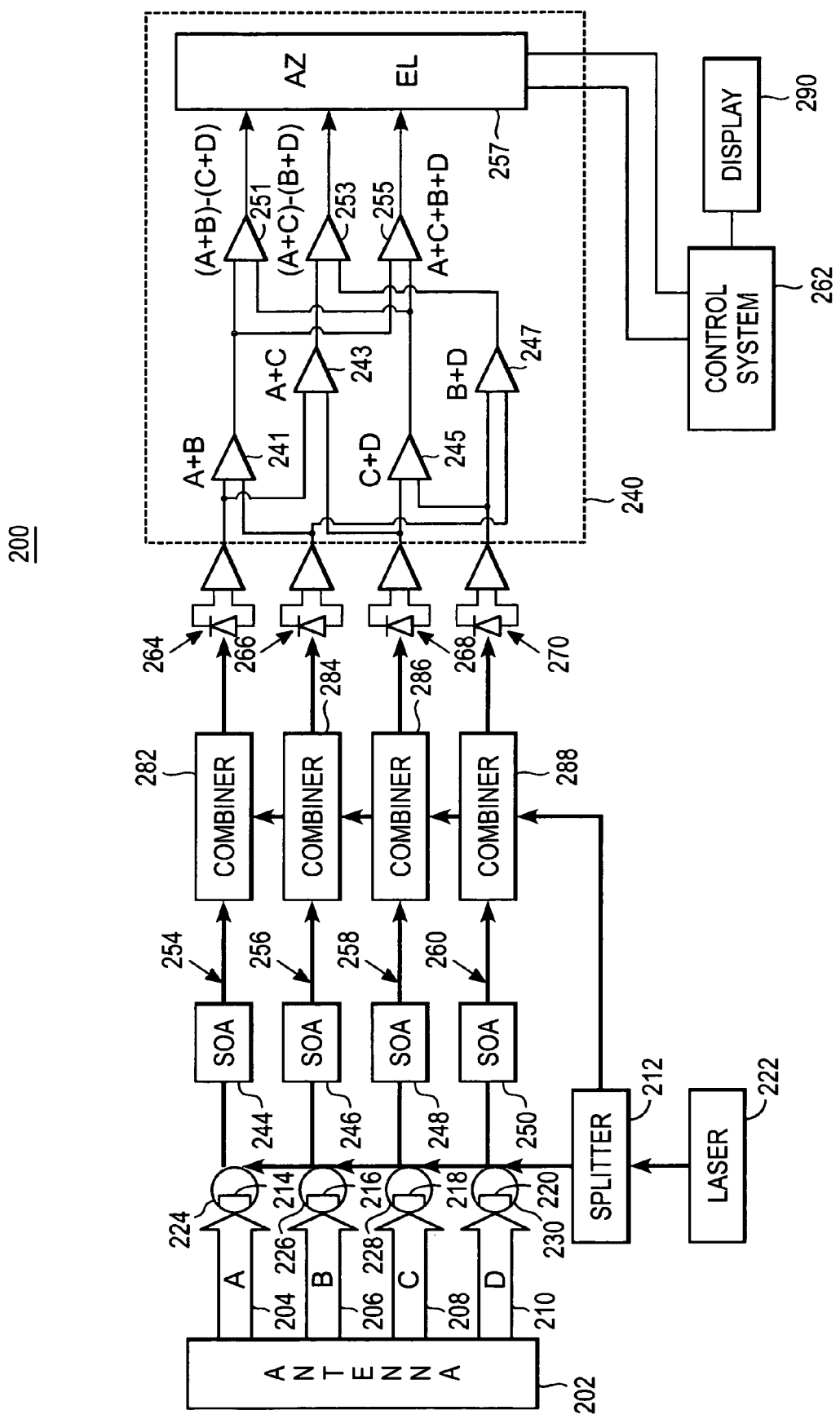
Figure 3:
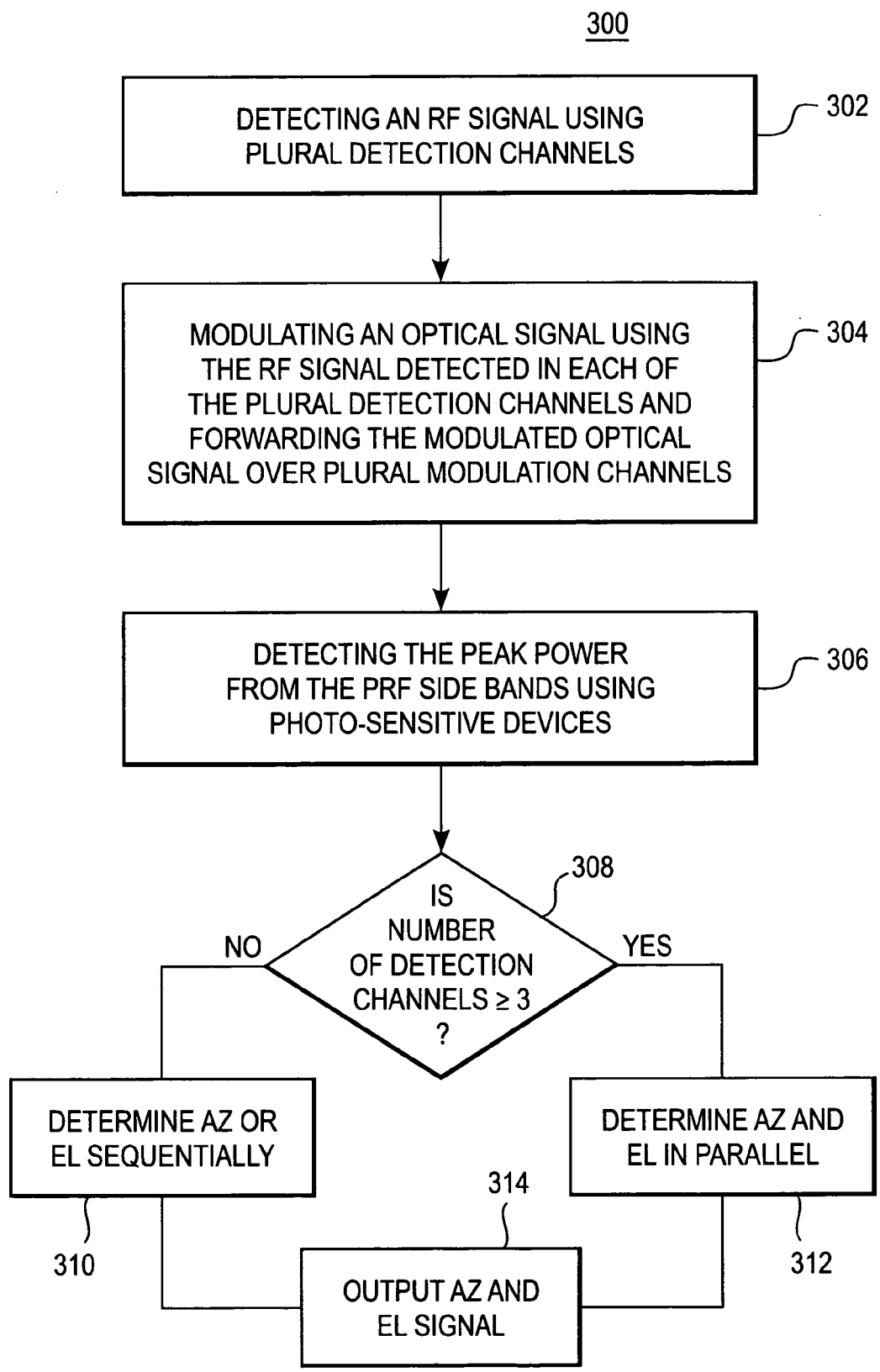

Other features and advantages will become apparent from the following description of preferred embodiments, when read in conjunction with the accompanying drawings, wherein:

FIG. 1 shows an exemplary signal processing system;
FIG. 2 shows another exemplary signal processing system; and
FIG. 3 shows a flow chart of an exemplary process.

DETAILED DESCRIPTION

FIG. 1 shows an exemplary signal processing system 100, using a self-mixing hybrid radio frequency and optical configuration such as a monopulse receiver system wherein a single pulse can be used to determine position information regarding a detected signal. In an exemplary embodiment, the power in pulse repetition frequency (PRF) sidebands of a received signal is used to determine position information. A signal processing system 100 includes an exemplary detecting means, such as an antenna 102. The antenna 102 can have plural microstrip antenna channels 104, 106, 108, 110 for detecting an RF signal. These channels may be microstrip, coax, hollow waveguide or other signal routing method suitable to the application. Each antenna channel 104, 106, 108, 110 corresponds to a separate quadrant on the antenna 102 that detects the RF signal. The antenna can be any multichannel design, such as a four quadrant design, slot, electronically steerable array, patch or other suitable antenna. Although the exemplary antenna 102 is shown providing four microstrip antenna channels 104, 106, 108, 110, it can provide fewer or more than four antenna channels.

An illuminating radio frequency (RF) source is used to illuminate a target, which reflects the RF signal, and the antenna 102 detects the reflected signal.

The illuminating RF source can be a continuous wave or pulsed RF signal source. Pulsed RF allows lower bandwidth, lower noise photodiodes to be used. The RF carrier frequency of the illuminating RF signal source and detected RF signal can be in the S, Ka, Ku or W bands, although other suitable RF frequencies can be used. If a continuous wave RF source is used to illuminate the target, the power contained in the reflected RF signal and detected by the antenna 102 is subsequently measured. Alternatively, if a pulsed RF signal source is used to illuminate a target, the power contained in the periodic repetition frequency (PRF) sidebands of the reflected RF signal and detected by the antenna 102 is subsequently measured.

The signal processing system also includes modulating means, such as a modular having one or more microresonator discs 124, 126, 128 and 130, and an energy source such as a laser 122. The microresonator discs 124, 126, 128 and 130 modulate an optical signal using the RF signal detected by the antenna 102. The optical signal is the laser light output from the laser 122, which is split by a splitter 112 into a beam for each of the plural detection channels. The laser light output from the laser 122 has a predetermined frequency, such as 200 THz, or lesser or greater.

An interface is configured between the antenna 102 and the microresonator discs 124, 126, 128 and 130 to couple the detected RF signal to the microresonator discs. The interface can include a microstrip waveguide channel 104, 106, 108 and 110 for each of the plural detecting channels of the antenna 102 and a resonant RF electrode 114, 116, 118 and 120 for each microresonator disc 124, 126, 128 and 130. Alternatively, the splitter 112 can be a separate laser 122 for each of the microresonator discs 124, 126, 128 and 130. Laser light of different frequencies can be output from each of the separate lasers 122.

The detected RF signal travels from the antenna 102 to a microstrip waveguide channel 104, 106, 108 or 110 based on the portion (e.g., quadrant) of the antenna 102 where the RF signal is detected. The detected RF signal travels via the microstrip waveguide channel 104, 106, 108 or 110 where it reflects off an open end of the microstrip, and back up the microstrip to meet incoming signal energy.

A standing electromagnetic wave is established in the microstrip waveguide channel 104, 106, 108, and 110, and is side coupled to an RF electrode 114, 116, 118 and 120 of the microresonator discs 124, 126, 128 and 130, respectively. In response to the detected RF signal with the microresonator disc RF electrodes 114, 116, 118 and 120, the optical signal provided by the laser 122 is modulated.

The microresonator disc RF electrode 114, 116, 118 and 120 resonant structure can be matched with the RF signal. The RF electrode resonant structure can be fabricated to operate in a frequency spectrum of between 7 GHz to 95 GHz, or lesser or greater.

The microresonator disc 124, 126, 128 and 130 can be configured as, or can include, a microphotonic resonator. The exemplary microphotonic resonator is made of high-Q, z-cut, lithium niobate (LiNbO$_3$) for its high electro-optic coefficient. The material can thus have an ability to respond to electric fields through refractive index changes due to strains in the microresonator crystal material at a rate equal to the applied RF frequency. The microphotonic resonator can be shaped as a disc approximately 200 μm thick by 2-5 mm in diameter with optically polished sidewalls, or with other suitable dimensions selected as a function of the desired application. For example, other microphotonic resonator shapes and material options can be used, including fused silica in spheres, ellipsoids, squares and triangles. Each microphotonic resonator disc can be capped above and below with the RF electrodes 114, 116, 118 and 120 overlapping optical "whispering gallery modes" confined to internal microphotonic resonator disc edges. These RF electrodes 114, 116, 118 and 120 pass the RF field to the interior of the microphotonic disc to modulate the optical signal from the laser 122.

Each microphotonic resonator disc has an input and output, and either or both of the input and output can be configured as a fiber optic cable attached to a micro-prism at its tip, or a single prism that is appropriately adjusted. For example, the micro-prism can be made of diamond and be on the order of 40 nm at its tip having an index of refraction of approximately 2.4. The micro-prism can, for example, be bonded to the RF electrode disc using a bonding material, such as Ultra Weld® OP-4-20632 light path adhesive, which has an index of refraction of 1.55. The input prism tip can be within approximately 20 nm-300 nm or other suitable distance of the microphotonic disc side wall.

The laser 122 can deliver approximately a 200 THz optical carrier (1.54 μm) or other suitable optical carrier frequency. The laser light output from the laser 122 cycles around the microphotonic disc within the microresonator discs 124, 126, 128 and 130 as determined by the microphotonic disc structure and composition. As the light circulates around the microphotonic disc interior, a self-mixing can occur whereby the interaction or mixing between the detected RF signal and the light from the laser interact to establish a modulated optical signal. The amplitude modulation is maximized when the laser is tuned to the slope of the microphotonic resonator discs resonance (i.e. the side of its bandpass). The laser can be tuned to the center of the microphotonic resonator discs resonance, but with lesser amplitude modulation.

An amplitude modulated optical signal is output from each microresonator disc 124, 126, 128 and 130 into one of the modulation channels 134, 136, 138 and 140, respectively. The modulated optical signal can be amplified by a semiconductor optical amplifier (SOA) 144, 146, 148 and 150. The amplified, modulated optical signal travels along optical waveguide 154, 156, 158 and 160 to a processor interface means configured, for example, as one or more interfaces 164, 166, 168, 170. The optical waveguide 154, 156, 158 and 160 can be fiber optic cable or any other means for transmitting optical signals.

The exemplary processor interface means can be any device capable of converting an optical signal into an electrical signal for processing. For example, each of the interfaces 164, 166, 168 and 170 can be configured as a photodiode. The photodiode of each interface 164, 166, 168 and 170 can be responsive to the optical signal, but can allow passage of a beat frequency, such as Ka-band, or base band pulse repetition frequency (PRF) of the detected RF signal to provide a monopulse functionality. Independent photodiodes, which are smaller than quad detectors with low capacitance and noise characteristics, can be used. The interfaces 164, 166, 168 and 170 can be used to detect peak power in the PRF sidebands.

The processing means can be configured as a hardware and/or software processor 142 which uses peak sideband power of the signal in each channel output from the interfaces 164, 166, 168 and 170, to determine an azimuth or an elevation measurement of the detected RF signal.

The processor 142 can be implemented using the exemplary logic circuits 172, 174, 176, 178, 180, 182 and 184 in combination with the signal processor 152 to output a signal representative of the azimuth or elevation of the detected RF signal. The signal processor can employ analog-to-digital converters (ADC) for numeric computation of target angle off boresight or it may employ analog circuits for this purpose. Alternatively, the processor can be implemented using software, field programmable gate arrays (FPGAs) or other hardware or firmware devices, and/or any combination of software, firmware and hardware to achieve the processing functionality described herein.

The azimuth and elevation signals output from the processor 142 can be input into a control system such as a vehicle control system 162 for guidance control and/or target acquisition. An exemplary vehicle can be an airborne vehicle, such as a rocket, missile, a tracked or wheeled vehicle, or any other type of mobile device. The processor 142 can use the peak power from PRF sidebands of the detected RF signal for each channel to determine the azimuth and/or elevation of the detected RF signal. Both the azimuth and elevation of the detected RF signal can be determined, and output to the vehicle control system 162.

In addition, the azimuth and elevation values or associated information can be displayed on display device 190.

FIG. 2 illustrates an alternative exemplary embodiment of a signal processing system using a Mach-Zehnder configuration. The signal processing system 200 shown in FIG. 2 includes substantially the same components as those in signal processing system 100 except for the optical combiners 282, 284, 286 and 288.

The outputs of the semiconductor optical amplifiers 244, 246, 248 and 250 are output on optical channels 254, 256, 258 and 260. The optical signals on optical channels 254, 256, 258 and 260 are respectively input into respective optical combiners 282, 284, 286, and 288. The optical output from the laser 222 is input into the splitter 212, whereby the optical signal is split into two paths: one of which is input into each microresonator 224, 226, 228 and 230 and the other which is input into the combiners 282, 284, 286 and 288. The optical combiners 282, 284, 286 and 288 combine the modulated optical signal from the microresonator 224, 226, 228 and 230, respectively with the optical signal output from the laser 222. Optical combiners 282, 284, 286 and 288 can be used if, for example, it is deemed self-mixing is inadequate for complete amplitude modulation or characteristics of the chosen microresonator discs warrant such a configuration.

The combined optical signals are output to photodiodes 264, 266, 268 and 270 comprising a processor interface. A processor 240 receives the signal output from each of the photodiodes 264, 266, 268 and 270 for each of the optical channels and processes the signals using exemplary logic circuits 241, 243, 245, 247, 251, 253 and 255. The signal output from each of the photodiodes 264, 266, 268 and 270 corresponds to the peak power from either the detected RF signal or the PRF sidebands of the detected RF signal. The output signals are combined using the exemplary logic circuits and are input to a signal processor 257. The signal processor 257 outputs azimuth or elevation signals to the control system 262, which can display the azimuth and elevation signal measurements and related information, such as vehicle identification and the like, on display 290. In addition, the signal can be increased using post-detection, non-coherent integration.

FIG. 3 illustrates an exemplary signal processing process 300. In step 302, an RF signal is detected using the plural detection channels of the antenna 102. Upon detecting an RF signal on each of the plural detection channels, the RF signal is used to modulate an optical signal (step 304). The modulated optical signal is output to a photo-sensitive device, where the peak power from either the detected RF signal or the PRF sidebands of the detected RF signal is detected (step 306).

At step 308, a determination is made whether the number of detection channels is greater than or equal to 3. If the number of detection channels is less than 3, the system can use the modulated optical signal to determine either the azimuth and/or elevation of the detected RF signal sequentially (step 310). For example, if only two channels on a rolling airborne missile platform are used, then the elevation calculation can be made first and the azimuth calculation be made after the missile rolls 90 degrees. Alternate determinations can be repeated as the system periodically updates the azimuth and elevation.

Alternatively, if the number of detection channels is greater than or equal to 3, the azimuth and elevation can be determined by the processor 142 in parallel (step 312). Regardless of the number of detection channels, azimuth and elevation values can be output to a control system or to a display or both (step 314).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A signal processing system, comprising:
   a detecting means for detecting an RF signal, wherein the detecting means has plural detection channels;
   a modulating means for modulating an optical signal with the detected RF signal and sending a modulated optical signal over plural modulation channels, the modulating means, for each modulation channel, inputting the detected RF signal from one of the detection channels in a microresonator, mixing a laser light of a predetermined frequency in the microresonator with the detected RF signal from the one detecting channel, and outputting a modulated optical signal from the microresonator in a modulation channel; and
   a processing means for processing the modulated optical signal to determine an azimuth or an elevation of the detected RF signal.

2. The system of claim 1, wherein the detecting means comprises:
   an antenna having at least two detection channels.

3. The system of claim 1, comprising an interface between the detecting means and the modulating means, the interface comprising a microstrip waveguide for coupling to the microresonator RF resonator electrodes.

4. The system of claim 1, wherein the plural modulation channels include a separate modulation channel provided for each detection channel, respectively.

5. The system of claim 4, wherein the optical signal of each modulation channel is of a different wavelength.

6. The system of claim 1, wherein the processing means determines both the azimuth and the elevation of the detected RF signal.

7. The system of claim 1, wherein the processing means is implemented in hardware.

8. The system of claim 1, wherein the processing means combines outputs from the plural modulation channels to determine the azimuth or elevation of the detected RF signal.

9. The system of claim 1, wherein the modulating means comprises combining means for combining the modulated optical signal with the optical signal to output a combined signal as the modulated optical signal.

10. The system of claim 1, wherein, for each modulation channel, a shape of the microresonator is one of a disc, sphere, ellipsoid, square, and triangle.

11. The system of claim 1, comprising an interface connected to the modulating means and including an optical waveguide and a photo-sensitive device, the photosensitive device outputting a signal corresponding to peak power of the RF signal, wherein the photo-sensitive device includes a peak power optical detector for each of the plural detection channels.

12. A signal processing system, comprising:
   a detecting means for detecting an RF signal, wherein the detecting means has plural detection channels;
   a modulating means for modulating an optical signal with the detected RF signal;
   an interface connected to the modulating means and including an optical waveguide and a photo-sensitive device, the photosensitive device outputting a signal corresponding to peak power of the RF signal, wherein the photo-sensitive device includes a peak power optical detector for each of the plural detection channels; and a processing means for processing the signal corresponding to the peak power of the RF signal to determine an azimuth or an elevation of the detected RF signal.

13. The system of claim 12, wherein the signal corresponding to the peak power of the RF signal corresponds to peak power of a detected PRF sideband of the RF signal.

14. The system of claim 12, wherein the optical waveguide is a fiber optic cable.

15. The system of claim 12, wherein the signal output from the photo-sensitive device is a signal corresponding to peak power in one sideband of a detected PRF sideband of the RF signal.

16. The system of claim 12, wherein the modulating means comprises:
a laser for outputting laser light as the optical signal.

17. The system of claim 16, wherein the modulating means comprises a microresonator, and
wherein the laser is tuned to a slope of the microresonator.

18. A signal processing system comprising:
an antenna having plural antenna channels for detecting a RF signal;
a modulator for modulating an optical signal with the detected RF signal from each of the plural antenna channels and outputting a modulated optical signal in a separate modulation channel for each of the plural antenna channels;
an interface for outputting signals corresponding to peak power of the detected RF signal in each modulation channel; and
a processor for determining, based on the signals from the interface, an azimuth value or an elevation value of the detected RF signal.

19. The system of claim 18, wherein the modulator comprises:
an electro-optic modulator in each modulating channel for modulating an optical signal with the detected RF signal and outputting the modulated optical signal in each separate modulating channel.

20. The system of claim 19, wherein the modulator comprises:
plural semiconductor optical amplifiers for amplifying the modulated optical signal.

21. The system of claim 20, in combination with a vehicle guidance system, wherein the processor is configured to supply the azimuth and elevation of the detected RF signal are supplied as an input to a vehicle guidance system for guidance control.

22. The system of claim 21, wherein the vehicle guidance system is a missile guidance system.

23. The system of claim 18, wherein the signals output from the interface correspond to the peak power of a detected PRF sideband of the RF signal in each channel, respectively.

24. The system of claim 18, wherein the processor determines both the azimuth and elevation of the detected RF signal.

25. The signal processing system of claim 18, wherein the modulator comprises a combiner for combining the modulated optical signal with the optical signal to output a combined signal as the modulated optical signal.

26. The system of claim 18, wherein the modulator comprises:
a microresonator.

27. The system of claim 26, wherein a shape of the microresonator is one of a disc, sphere, ellipsoid, square, and triangle.

28. The system of claim 26, wherein the modulator comprises:
a laser for outputting laser light as the optical signal.

29. The system of claim 28, wherein the laser is tuned to a slope of the microresonator.

30. A method for processing a signal, comprising:
detecting an RF signal using plural detection channels;
modulating an optical signal using the RF signal detected by each of the plural detection channels and sending a modulated optical signal over plural modulation channels;
determining an azimuth or elevation of the detected RF signal using signals from each of the plural modulation channels, wherein the modulating comprises, for each modulation channel:
inputting the detected RF signal from one of the detection channels into a microresonator;
mixing a laser light of a predetermined frequency in the microresonator with the detected RF signal from the one detecting channel; and
outputting a modulated optical signal from the microresonator into a modulation channel.

31. The method of claim 30, wherein each modulation channel comprises:
a fiber optic cable.

32. The method of claim 30, comprises: comprising:
inputting the modulated optical signal to a photodiode; and
outputting a signal corresponding to peak power of the detected RF signal.

33. The method of claim 32, wherein the signal corresponds to the peak power of a PRF sideband of the detected RF signal.

34. The method of claim 30, wherein the determining comprises:
combining the signals from each of the plural modulation channels; and
determining the azimuth and elevation from the combined signals.

35. The method of claim 30, further comprising:
combining the modulated optical signal with the optical signal to output a combined signal as the modulated optical signal.

36. The method of claim 30, wherein a shape of the microresonator is one of a disc, sphere, ellipsoid, square, and triangle.

37. The method of claim 30, wherein, for each modulation channel, the laser light is tuned to a slope of the microresonator.

38. A method for processing a signal, comprising:
detecting an RF signal using plural detection channels;
modulating an optical signal using the RF signal detected by each of the plural detection channels and sending a modulated optical signal over plural modulation channels;
inputting the modulated optical signal to a photodiode;
outputting a signal corresponding to peak power of the detected RF signal; and
determining an azimuth or elevation of the detected RF signal using signals from each of the plural modulation channels.

39. The method of claim 38, wherein the signal corresponds to the peak power of a PRF sideband of the detected RF signal.

40. A signal processing system, comprising:
an antenna having plural antenna channels for detecting a RF signal;

a modulator for modulating an optical signal with the detected RF signal from each of the plural antenna channels and outputting a modulated optical signal in a separate modulation channel for each of the plural antenna channels, the modulator, for each modulation channel, inputting the detected RF signal from one of the detection channels in a microresonator, mixing a laser light of a predetermined frequency in the microresonator with the detected RF signal from the one detecting channel, and outputting a modulated optical signal from the microresonator in a modulation channel; and a processor for processing the modulated optical signal to determine an azimuth or an elevation of the detected RF signal.

41. The signal processing system of claim 40, comprising an interface for outputting signals corresponding to peak power of the detected RF signal in each modulation channel.

42. The system of claim 41, wherein the signals corresponding to the peak power of the RF signal correspond to peak power of a detected PRF sideband of the RF signal.

* * * * *